Dec. 25, 1928.  1,696,371
C. E. WALLACE
CLAM DIGGER
Filed Feb. 6, 1928
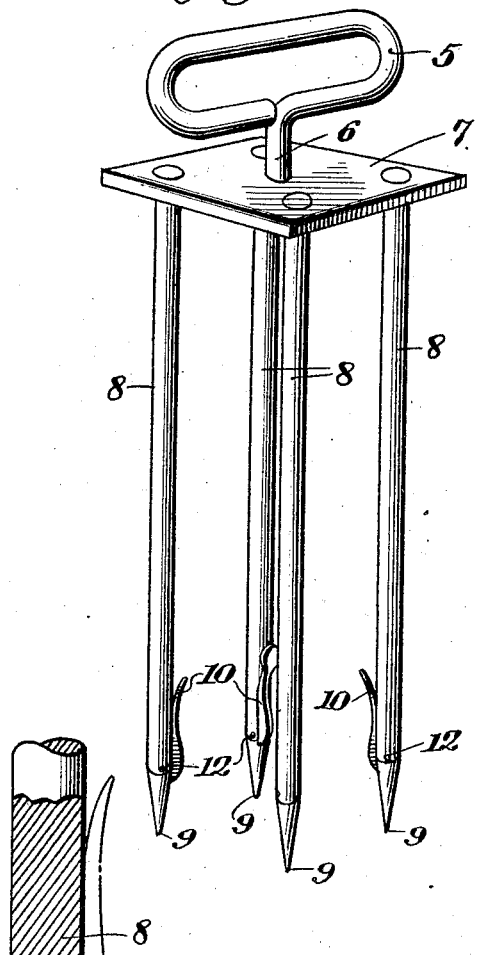
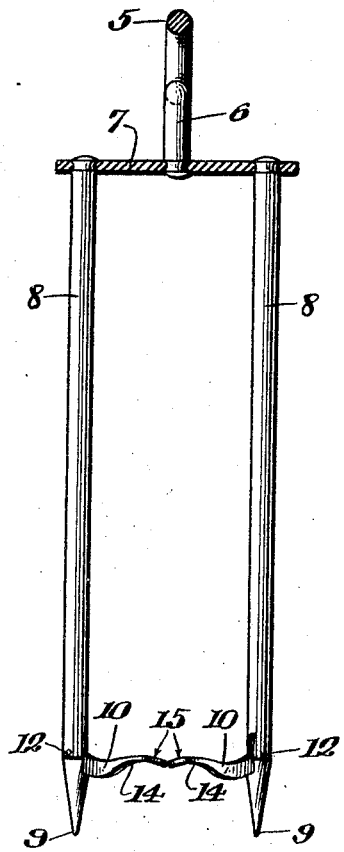
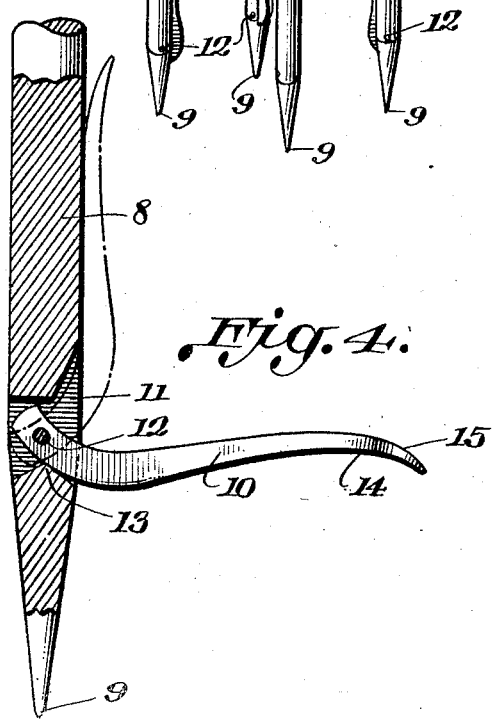
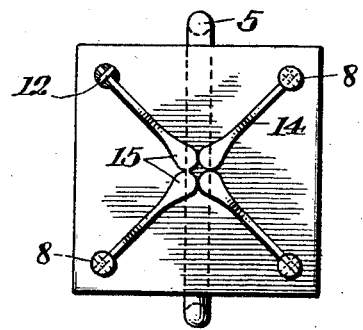
Inventor:
Clifford E. Wallace
by his Attorneys Patented Dec. 25, 1928.

1,696,371

UNITED STATES PATENT OFFICE.

CLIFFORD E. WALLACE, OF DALLAS, OREGON.

CLAM DIGGER.

Application filed February 6, 1928. Serial No. 252,218.

This invention relates to a clam digger and has amongst its several objects to provide a hand operated tool by means of which clams may be easily located and readily lifted from their beds, and to provide such a digger which is composed of comparatively few parts and which is therefore simple in construction, cheap to manufacture, and durable in operation.

With these and other objects in view which will more fully appear, the nature of the invention will be more clearly understood by following the description, the appended claims, and the several views illustrated in the accompanying drawings.

In the accompanying drawings which illustrate one form of my invention:

Fig. 1 is a perspective view of a clam digger embodying my invention,

Fig. 2 is a central vertical section therethrough,

Fig. 3 is a bottom plan view, and

Fig. 4 is an enlarged detail sectional view showing the pivotal connection between one of the tines and the associated barb.

Like reference numerals designate corresponding parts throughout the several figures of the drawings.

Referring to the accompanying drawings, my invention comprises a handle 5, preferably of the loop type, having a shank 6 to the end of which is fixedly secured a plate 7. The general plane of the plate 7 is at right angles to the axis of the shank 6 and the shank is preferably attached to the central part of said plate.

A plurality of tines 8, preferably four in number, are rigidly attached at their upper ends to the plate 7. These tines are arranged in spaced relation and in parallelism around a common center. The tines are made of metal and are of uniform lengths, the lower or free ends being pointed as indicated at 9.

Associated with each tine 8 is a barb 10. Each barb has one end extending into a transverse opening 11 formed in the lower end of the tine. This end of the barb is pivoted upon a horizontal pin 12 so as to permit the barb to swing upwardly into parallelism with the tine as shown by the dotted line in Fig. 4. The lower wall of the opening 11 is formed with a stop or shoulder 13 to limit the downward swinging movement of the barb to the horizontal position shown in full lines in Fig. 4. The inner end of each barb is curved as at 14 and is provided with a flattened free end 15, the curved end extending inwardly, that is, away from the tine, when the barb is in its uppermost position as shown by the dotted line in Fig. 4. The barbs 10 are of equal lengths and when the barbs are in their horizontal positions, as shown in Figs. 2 and 3, the flattened inner ends 15 are in close proximity to one another.

In the operation of my clam digger, it will be remembered that clams are very often disposed below the floor line of the river bed, and consequently these clams are invisible to the person desiring to locate them. The handle 5 of my clam digger is grasped by the operator and the points 9 of the tines are caused to penetrate the river bottom until a clam is located. By reason of the tines being disposed about a common center, the tines can then be readily positioned around a clam. As the tines are pushed downwardly into the soil, the barbs 10 are in their uppermost positions as shown in Fig. 1. The tines are pushed downwardly until the barbs are below the clam and then the tool is drawn upwardly, this upward movement of the tool causes the soil to engage the inwardly curved and flattened end portions 14 and 15 of the barbs and forces the barbs downwardly to their horizontal positions below the clam. Thus the clam can be readily lifted from its bed by a further raising of the tool.

It is of course to be understood that the details of structure and arrangements of parts may be variously changed and modified without departing from the spirit and scope of my invention.

I claim:

1. In a clam digger, the combination of a handle, a plurality of spaced tines connected to the handle and arranged in parallelism about a common center, inwardly extending barbs pivoted to the tines adjacent the ends thereof opposite the handle, the pivots of the barbs permitting the latter to swing upwardly into parallelism with the respective tines, and stops carried by the tines for cooperation with the barbs to limit their downward swinging movements to positions at substantially right angles to the central axis of the tines.

2. In a clam digger, the combination of a handle, a plurality of spaced tines connected to the handle and arranged in parallelism about a common center, inwardly extending barbs pivoted to the tines adjacent the ends thereof opposite the handle, the pivots of the barbs permitting the latter to swing upwardly into parallelism with the respective tines, and stops carried by the tines for cooperation with the barbs to limit their downward swinging movements to positions at substantially right angles to the central axis of the tines, said barbs being of such lengths as to position their inner ends in close proximity to one another when said barbs are in their downward positions.

3. In a clam digger, the combination of a handle, a plurality of spaced tines connected to the handle and arranged in parallelism about a common center, inwardly extending barbs pivoted to the tines adjacent the ends thereof opposite the handle, the pivots of the barbs permitting the latter to swing upwardly into parallelism with respective tines, and stops carried by the tines for cooperation with the barbs to limit their downward swinging movements to positions at substantially right angles to the central axis of the tines, the inner or free ends of the tines being flat and curved away from the tines when the barbs are in their upward positions in parallelism with the tines.

4. In a clam digger, the combination of a handle, a plate rigidly secured to the handle, a plurality of spaced tines rigidly secured at one end to the plate and extending in a direction away from the handle, said tines being arranged in parallelism about a common axis, inwardly extending barbs pivoted to the tines adjacent the ends thereof opposite the handle, the pivots of the barbs permitting the latter to swing upwardly into parallelism with the respective tines, and stops carried by the tines for cooperation with the barbs to limit their downward swinging movements to positions at substantially right angles to the central axis of the tines, said barbs being of such lengths as to position their inner ends in close proximity to one another when said barbs are in their downward positions, the inner or free ends of the barbs being flat and curved away from the tines when the barbs are in their upward positions in parallelism with the tines.

In testimony whereof, I have hereunto subscribed my name.

CLIFFORD E. WALLACE.